(12) United States Patent
Skiba et al.

(10) Patent No.: US 7,819,436 B2
(45) Date of Patent: Oct. 26, 2010

(54) ENDFORMED TUBULAR ASSEMBLY

(75) Inventors: Terence Skiba, Marion County, FL (US); Randy Stanley, Marion County, FL (US); John D. Scherschel, Ocala, FL (US); Donald L. Oglesby, Ocala, FL (US); Herb Lemaster, Marion County, FL (US); Gary Iler, Oakland County, MI (US)

(73) Assignee: YH America, Inc., Versailles, KY (US)

( * ) Notice: Subject to any disclaimer, the term of this patent is extended or adjusted under 35 U.S.C. 154(b) by 650 days.

(21) Appl. No.: 11/769,305

(22) Filed: Jun. 27, 2007

(65) Prior Publication Data

US 2009/0001715 A1 Jan. 1, 2009

(51) Int. Cl.
*F16L 39/00* (2006.01)

(52) U.S. Cl. .................. 285/124.3; 285/382.4; 285/205

(58) Field of Classification Search .............. 285/124.2, 285/124.3, 382.4, 205, 206, 207, 208, 209, 285/210
See application file for complete search history.

(56) References Cited

U.S. PATENT DOCUMENTS

| | | | | |
|---|---|---|---|---|
| 1,021,485 A | * | 3/1912 | Ross | 285/285.1 |
| 1,637,365 A | * | 8/1927 | Wernle | 285/208 |
| 3,638,305 A | * | 2/1972 | Bottcher | 29/882 |
| 3,650,548 A | * | 3/1972 | Hussauf | 285/3 |
| 4,142,843 A | * | 3/1979 | Kish | 417/313 |
| 4,389,134 A | * | 6/1983 | Colas | 403/263 |
| 4,597,687 A | * | 7/1986 | Colas | 403/242 |
| 4,667,989 A | * | 5/1987 | Daua Bona | 285/382.4 |
| 4,765,661 A | * | 8/1988 | Fukushima et al. | 285/382.5 |
| 4,796,927 A | * | 1/1989 | Bona et al. | 285/190 |
| 5,294,156 A | | 3/1994 | Kumazaki et al. | |
| 5,387,014 A | | 2/1995 | Chevallier | |
| 5,398,729 A | | 3/1995 | Spurgat | |
| 5,423,581 A | | 6/1995 | Salyers | |
| 5,430,603 A | | 7/1995 | Albino et al. | |
| 5,556,138 A | | 9/1996 | Nakajima et al. | |
| 5,607,194 A | * | 3/1997 | Ridenour | 285/334.5 |
| 5,772,160 A | | 6/1998 | Gordon | |
| 5,860,681 A | | 1/1999 | Slais | |
| 5,944,360 A | * | 8/1999 | Crapart | 285/55 |
| 5,961,157 A | | 10/1999 | Baron et al. | |
| 5,984,376 A | | 11/1999 | Lampe | |
| 5,992,898 A | | 11/1999 | Saylor | |
| 6,010,327 A | * | 1/2000 | Katchka | 431/75 |
| 6,233,992 B1 | | 5/2001 | Geisman | |
| RE37,246 E | * | 6/2001 | Ridenour | 285/334.5 |
| 6,328,073 B1 | | 12/2001 | Slais | |
| 6,378,908 B1 | | 4/2002 | Walker et al. | |

(Continued)

*Primary Examiner*—Aaron Dunwoody
(74) *Attorney, Agent, or Firm*—Dinsmore & Shohl LLP (57) ABSTRACT

An endform tubular assembly for a hydraulic system comprises (1) a connector member having an inner surface exhibiting a stepped configuration and a fixing member at the distal end thereof, and (2) an endform tubular member having an outer surface corresponding to the inner surface of the connector member, wherein the endform tubular member mates with inner surface of the connector member to provide an endform tubular assembly having an improved design for conveying fluids in a hydraulic system. The endform tubular assembly has inherent features therein that are measured to provide quantified values for assessing the robustness of the assembly and predict the performance of such assembly in high pressure applications for prolonged periods of time.

39 Claims, 4 Drawing Sheets

U.S. PATENT DOCUMENTS

| | | |
|---|---|---|
| 6,382,678 B1 * | 5/2002 | Field et al. ..................... 285/3 |
| 6,488,314 B1 | 12/2002 | Hutter |
| 6,505,862 B1 * | 1/2003 | Stoll .......................... 285/205 |
| 6,517,126 B1 * | 2/2003 | Peterson et al. .......... 285/382.4 |
| 6,634,679 B1 | 10/2003 | Stieler |
| 6,637,779 B2 | 10/2003 | Andre |
| 6,682,100 B2 | 1/2004 | Wood et al. |
| 6,776,421 B2 | 8/2004 | Florence et al. |
| 6,908,117 B1 | 6/2005 | Pickett, Jr. et al. |
| 7,032,500 B1 | 4/2006 | Sinclair et al. |
| 7,062,834 B2 | 6/2006 | Patterson et al. |
| 7,155,906 B2 | 1/2007 | Yokota et al. |
| 7,490,870 B2 * | 2/2009 | Shah et al. ................ 285/382.4 |

\* cited by examiner

ENDFORMED TUBULAR ASSEMBLY

BACKGROUND OF THE INVENTION

1. Field of the Invention

The present invention relates to fluid flow assemblies and, in particular, to tubular assemblies for pressurized fluid flow. More particularly, the present invention relates to an endform tubular assembly possessing reliable features for assessing the robustness of the endform tubular assembly in an automotive power steering system.

2. Discussion of Related Art

Power steering systems include a steering gear housing, a steering gear disposed in the steering gear housing, a pump for moving the power steering fluid under pressure, and a fluid flow bundle including a supply line for transporting pressurized fluid from the pump to the steering gear, and a return line for transporting the fluid from the steering gear back to the pump. Typically, such fluid flow bundles include one or more brackets or support members that are used to mount the power steering components within an automotive vehicle. The ends of the supply tube and the return tube may be individually connection to an inlet port and an outlet port in the housing, respectively, by employing means such as a "tube-o" connector wherein a threaded nut is used behind each of the tube-o connectors to secure each of the tubes to a corresponding threaded port in the housing. Tube-o connectors generally are considered to be inefficient since they require a separate installation step for each connection.

Other assemblies have been developed wherein a bracket is used to simultaneously couple a fluid supply line and a fluid return line in a fluid flow bundle using a single fastener wherein the complete system is connected to a housing with the torque of the single fastener. While the single torque bracket connection is effective for reducing the number of operational steps necessary in the assembling process, such assemblies are unsatisfactory because they generally require that at least one of the tubular members be brazed into a machined connector. Brazed connections are not reliable, particularly in applications where the brazed part is subjected to the harsh environmental conditions present in the engine compartment of an automotive vehicle. For example, the brazed part may be subjected to extremely cold temperatures in winter during periods when the automotive vehicle is not operating and then suddenly required to withstand high temperatures and pressures during operation of the automotive vehicle. Constant vibrational episodes and occasional debris entering the compartment also severely reduce the life expectancy of such brazed connections. Another disadvantage of prior brazed clamp plate connections is that the clamp plate does not sit flush against the housing, such that when torque is applied to the fastener, the bracket may distort leading to premature o-ring failure.

U.S. Pat. No. 7,032,500 describes a fluid flow bundle for a power steering system wherein both a pressure line and a fluid return line are simultaneously connected to a steering gear using a bracket requiring only a single fastener. The bracket includes an aperture through which the high pressure line extends and a U-shaped aperture configured to receive a return line assembly. The return line assembly includes a connector member to which the hose is brazed or welded. The connector member also includes a pair of circumferential flanges, which allows the U-shaped aperture in the bracket to swing over the connector member such that the return line assembly is secured to the bracket member between the pair of circumferential flanges. In such arrangement, the connector is compressed into the port to create a seal The high pressure tube is deformed to create a first bead and, after the high pressure line is inserted through the bracket, a second bead is formed to secure the high pressure tube to the bracket. Such arrangements are not without disadvantages. For example, the fluid flow bundle may employ undesirable brazing or welding for securing at least one of the supply line and the return line to the connector. Also two separate steps are needed to form the two beads on either side of the bracket for securing the non-brazed high pressure line to the bracket. Such arrangement is not only time consuming and labor intensive, but the supply line may be susceptible to undesirable axial rotation as well as up/down and side to side movement in the bracket. Such movements severely limit the life expectancy of the assembly. Furthermore, each of the return and pressure lines requires the additional step of forming a groove in the ends of the lines for receiving an o-ring. Consequentially, current tubular assembly design does not provide an economical fluid flow assembly having assured long term dependability and structural integrity, nor does it provide inherent features, which allow the reliable assessment of the robustness of such fluid, flow assembly.

Therefore, it would be desirable to provide a power steering assembly having a robust design exhibiting improved sealability, long term dependability and reduced manufacturing costs, and which has inherent computable quality control features for assessing the robustness of the endform tubular assembly and for predicting the performance of the endform tubular assembly in high pressure applications for prolonged periods of time.

3. Related Applications

The contents of copending applications U.S. Ser. No. 11/769,316, and U.S. Ser. No. 11/769,352, both relating to the same subject matter as the present application, and both of which are filed simultaneously herewith, are incorporated herein by reference thereto.

SUMMARY OF THE INVENTION

It is an object of the invention to provide an endform tubular assembly having improved sealing characteristics.

It is another object of the invention to provide a fluid flow assembly utilizing the endform tubular assembly having improved sealing characteristics.

It is yet another object of the invention to provide an endform tubular assembly having measurable structural elements for determining the robustness of the endform tubular assembly.

It is still another object of the invention to provide a non-destructive method for determining the robustness of the endform tubular assembly.

It is yet another object of the invention to provide an endform tubular assembly having measurable structural elements for predicting the performance of the endform tubular assembly in high pressure applications for prolonged periods of time.

It is still another object of the invention to provide a non-destructive method for predicting the performance of the endform tubular assembly in high pressure applications for prolonged periods of time.

The present invention provides a robust endform tubular assembly, which is particularly useful in a fluid, flow assembly for conveying fluid in a hydraulic system such as a power steering system. Typically, a fluid flow bundle includes first and second tubular assemblies each disposed between a pump and a power steering housing in power steering systems. The first tubular assembly provides pressurized fluid from the pump to the power steering housing and the second tubular assembly returns fluid from the power steering housing to the pump. The fluid flow assembly further includes a clamp plate configured for simultaneously connecting the first endform tubular assembly and the second tubular assembly to the housing using a single torque on a fastener.

The endform tubular assembly of the present invention includes a connector member and an endform tubular member wherein the outer surface of the endform tubular member corresponds to the inner surface of the connector member so that the endform tubular member mates with the connector member and is securely integrated therewith. Typically, the connector member is a machined connector member having an outer surface and an inner tubular surface extending the longitudinal length of the connector member. More particularly, the connector includes a first shoulder portion defining a distal end of the connector member, the first shoulder portion including at least one fixing member integral with the distal end of the first shoulder portion; (ii) a second shoulder portion defining a proximal end of the connector member; and (iii) a brim or flange portion formed on the connector member intermediate the first and second shoulder portions such that the brim or flange extends perpendicularly with respect to the outer surfaces of the first and second shoulders.

The endform tubular member has an inner surface and outer surface, the outer surface corresponding to the inner surface of the connector member securely locking the endform tubular member to the connector member. The endform tubular member includes a bead uniformly formed circumferentially around the outer surface of the endform tubular member adjacent the distal end of the first shoulder portion of the connector member. The bead fixedly engages the fixing member(s) in the first shoulder portion to prevent axial rotation of the endform tubular member relative to the first shoulder portion, and to further prevent longitudinal movement of the endform tubular member relative to the first shoulder portion. The bead also provides a first unique and important feature in the endform tubular assembly of the invention. A precise measurement of the diameter of the bead provides a quantifiable value for assessing the robustness of the endform tubular assembly and for predicting the performance of the endform tubular assembly in high pressure applications over prolonged periods of time.

The endform tubular assembly of the present invention is a robust design that is designed to eliminate failure modes associated with brazing and/or welding that can cause reduced operating life of the assembly; prevent structural deformation of the clamp plate during use; and prevent premature o-ring failure commonly found in conventional fluid-conveying tubular assemblies.

A particular advantage of the endform tubular assembly design of the present invention is that the assembly includes at least two inherent features that can be measured and the quantifiable values obtained can be used individually or in combination to assess the robustness of the endform tubular assembly, and predict the performance probability of the endform tubular assembly in high pressure applications.

DETAILED DESCRIPTION OF THE INVENTION

In accordance with a first embodiment of the invention, an endform tubular assembly having a robust design exhibiting improved sealability, long-term dependability and reduced manufacturing costs is provided. In a second embodiment of the invention, an endform tubular assembly having improved properties is employed in a fluid flow assembly for conveying fluid in a hydraulic system such as a power steering system, power brake system, air conditioner system, oil cooler system, various heating systems, and the like. In a third embodiment of the invention, a method is described for the non-destructive evaluation of the endform tubular assemblies to determine the robustness of the assemblies during the endforming process. The evaluation of the assemblies is quickly and reliably performed by making a simple measurement on at least one inherent feature of the assembly. This third embodiment will be discussed more fully below.

According to the first embodiment of the invention, an endform tubular assembly for a hydraulic system, the endform tubular assembly comprising:

(a) a connector member comprising:
(i) a first shoulder portion, the first shoulder portion defining a distal end of the connector member, the first shoulder portion including at least one fixing member integral therewith; the first shoulder portion;
(ii) a second shoulder portion defining a proximal end of the connector member; and
(iii) a brim portion intermediate the first shoulder portion and the second shoulder portion, the brim portion extending perpendicularly relative to the first shoulder portion and the second shoulder portion, the connector member having an inner wall surface extending there through comprising a first inner wall portion having a first diameter, a second inner wall portion having a second diameter, and a third inner wall portion having a third diameter, wherein the second diameter is different from the first diameter, and the third diameter is different from the second diameter, the third diameter forming a gauge diameter depth in the proximal end of the connector member;

(b) an endform tubular member comprising:
(i) an intermediate portion having an inner surface and an outer surface, the outer surface of the intermediate portion corresponding to the inner wall surface of the connector member, wherein the outer surface of the endform tubular member fixedly engages the inner wall surface of the connector member;
(ii) a distal portion having an inner surface and an outer surface, the distal end extending axially from the intermediate portion, the distal portion having a bead formed therein adjacent the first shoulder portion of the connector member, wherein the bead fixedly engages the at least one fixing member in the first shoulder portion to prevent axial rotation of the endform tubular member relative to the connector member, the diameter of the bead compared to a predetermined diameter is a reliable indication of the robustness of the endform tubular assembly; and (iii) a proximal portion having an inner surface and an outer surface, the proximal end extending axially from the intermediate portion, the inner surface of the proximal portion defining a gauge diameter depth, the depth of the gauge diameter depth compared to a predetermined depth is a reliable indication of the robustness of the endform tubular assembly.

In a preferred embodiment of the invention, the endform tubular assembly is employed as at least one of a first tubular assembly and a second tubular assembly in a fluid flow assembly for a power steering system, wherein the fluid flow assembly comprises a housing having a steering gear disposed therein, the housing including a first port extending from an outer surface of the housing to an inner surface of the housing and a second port extending from the outer surface of the housing to the inner surface of the housing; a pump; a first endform tubular assembly having a first end connected to the first port in the housing and a second end attached to the pump, wherein the first endform tubular assembly conveys fluid under pressure from the pump to the housing through the first port; and a second tubular assembly having a first end connected to the second port in the housing and a second end connected to the pump, wherein the second tubular assembly conveys fluid from the housing to the pump, and a clamp plate having a first aperture through which the first tubular assembly extends, a U-shaped second aperture through which the second tubular assembly extends, and a third aperture configured for connecting the clamp plate to the hydraulic housing, wherein the first port for receiving the first tubular assembly and the second port for receiving the second tubular assembly are configured to receive the first tubular assembly and the second tubular assembly such that the clamp plate fits flush against the housing.

According to the preferred embodiment of the invention, the tubular assembly comprises:

(a) a connector member comprising:
(i) a first shoulder portion, the first shoulder portion defining a distal end of the connector member, the first shoulder portion including at least one fixing member integral with the first shoulder portion;
(ii) a second shoulder portion defining a proximal end of the connector member; and
(iii) a brim portion intermediate the first shoulder portion and the second shoulder portion, the brim portion extending perpendicularly relative to the first shoulder portion and the second shoulder portion, the connector member having an inner wall surface extending there through comprising a first inner wall portion having a first diameter, a second inner wall portion having a second diameter, and a third inner wall portion having a third diameter, wherein the second diameter is different from the first diameter, and the third diameter is different from the second diameter, the third diameter forming a gauge diameter depth in said proximal end of the connector member;

(b) an endform tubular member comprising:
(i) an intermediate portion having an inner surface and an outer surface, the outer surface corresponding to the inner wall surface of the connector member, wherein the outer surface of the endform tubular member fixedly engages the inner wall surface of the connector member;
(ii) a distal portion having an inner surface and an outer surface, the distal end extending axially from the intermediate portion, the distal portion having a bead formed therein adjacent the first shoulder portion of the connector member, wherein the bead fixedly engages the at least one locking member to prevent axial rotation of the endform tubular member relative to the connector member, the diameter of the bead compared to a predetermined diameter is a reliable indication of the robustness of the endform tubular fitting assembly; and
(iii) a proximal portion having an inner surface and an outer surface, the proximal end extending axially from the intermediate portion, wherein the inner surface of the proximal portion defines a gauge diameter depth, the depth of the gauge diameter depth compared to a predetermined depth is a reliable indication of the robustness of the endform tubular fitting assembly;

(c) an o-ring disposed on the outer surface of the proximal portion of the endform tubular fitting member, the o-ring configured to mate with the housing to seal the endform tubular fitting member to the housing, wherein the proximal end of the endform tubular fitting assembly is flared to retain the o-ring thereon; and (d) a retaining ring disposed between the o-ring and the outer surface of the shoulder portion of the endform tubular fitting assembly, the retaining ring having sufficient resilience to prevent extrusion of the o-ring onto the second shoulder.

Figure 1:
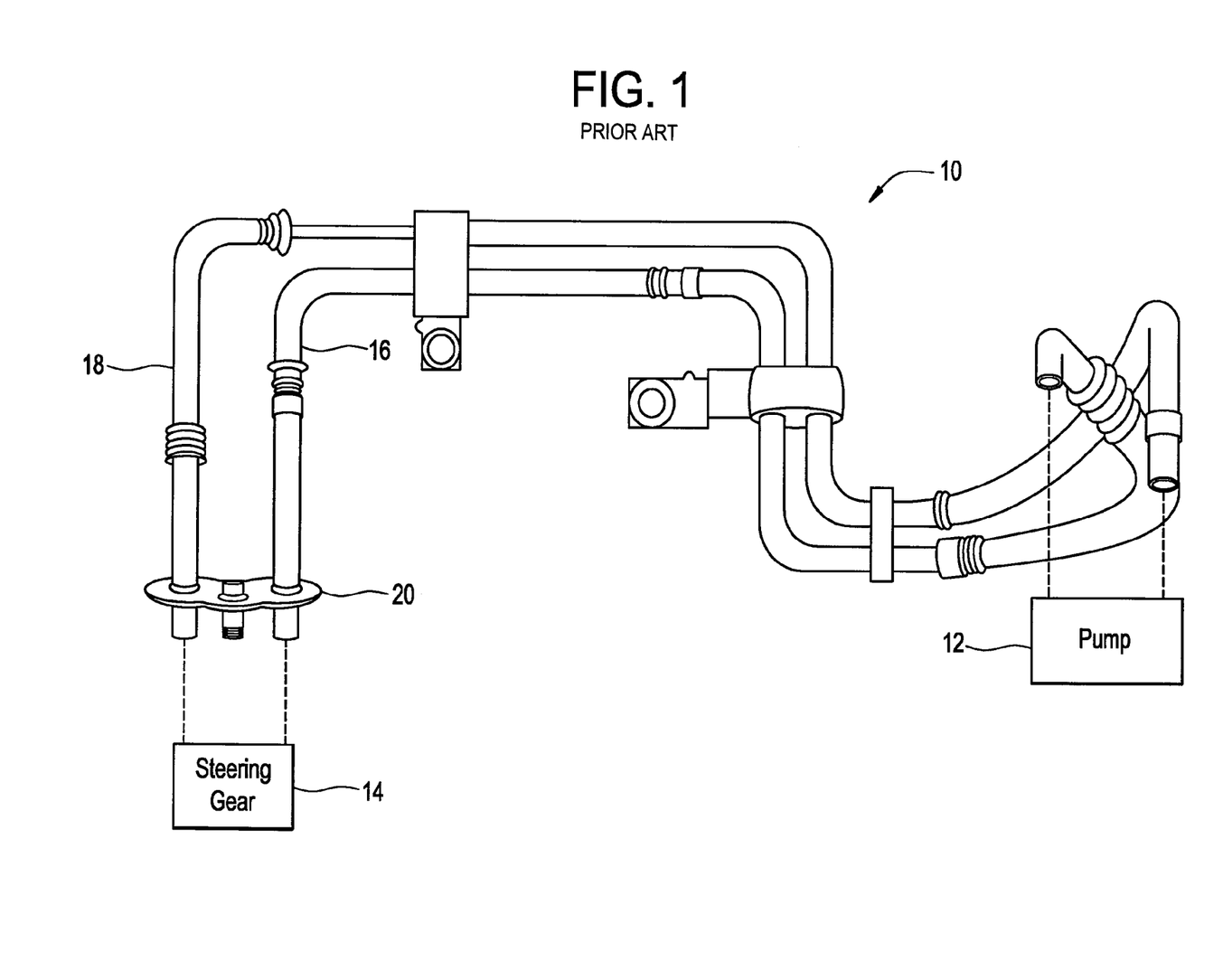
FIG. 1 is a diagrammatic view of a conventional power steering assembly as described in the prior art.
Figure 2:
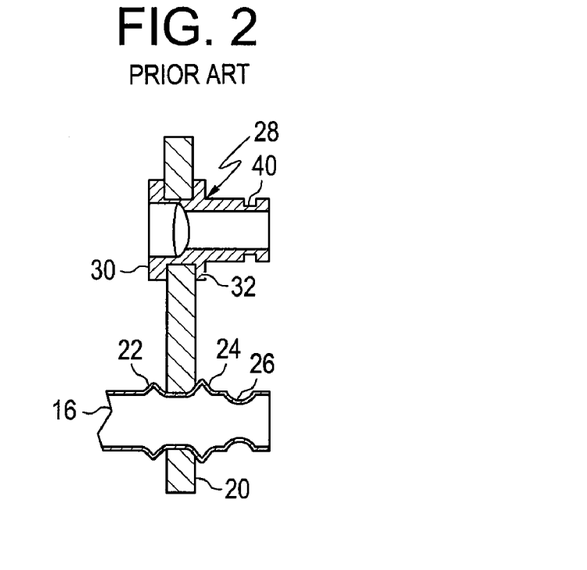
FIG. 2 is a sectional view of a portion of a tubular assembly in accordance with of FIG. 1.

Referring now to the drawings, FIGS. 1 and 2 are provided solely to show the state of the prior art as it relates to fluid flow assemblies for power steering systems. FIG. 1 shows a prior art power steering assembly 10, which includes a pump 12, a steering gear 14, a first hose assembly 16 for conveying pressurized fluid from the pump to the steering gear, and a second hose assembly 18 for returning fluid to the pump. FIG. 2 shows a sectional view of a portion of the prior art assembly of FIG. 1 wherein the first hose assembly 16 employs two spaced beads 22, 24 to secure the hose to a bracket 20. The second hose assembly 18 includes a connector 28 having a pair of spaced circumferential flanges 30, 32 for receiving the bracket 20 between the circumferential flanges 30, 32 thereby securing the hose to the bracket 20.

Figure 3:
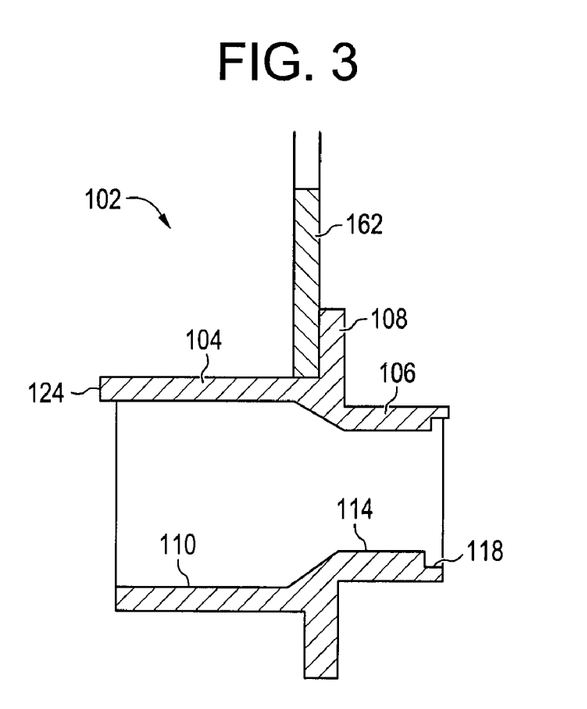
FIG. 3 is a longitudinal cross-sectional view of a connector member in accordance with the present invention.
Figure 4:
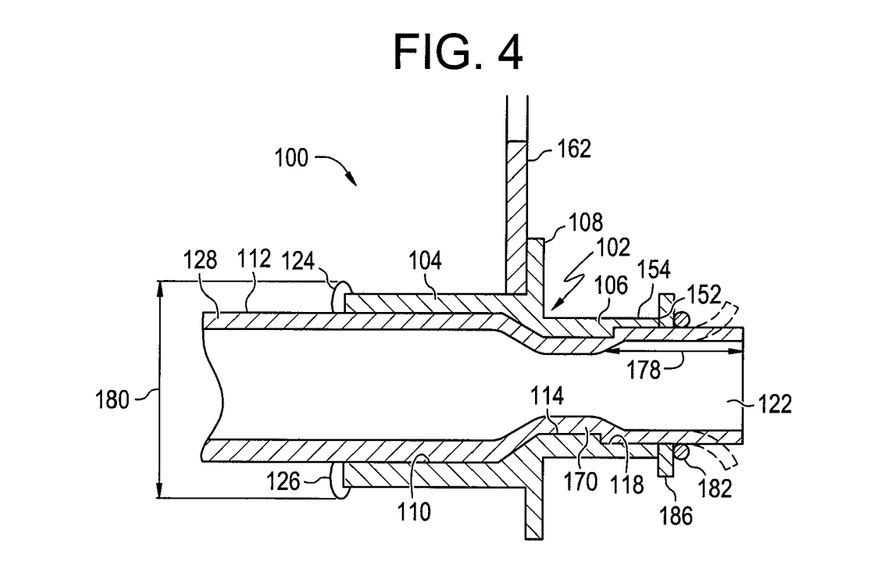
FIG. 4 is a longitudinal cross-sectional view of an endform tubular assembly in accordance with the invention.
Figure 5:
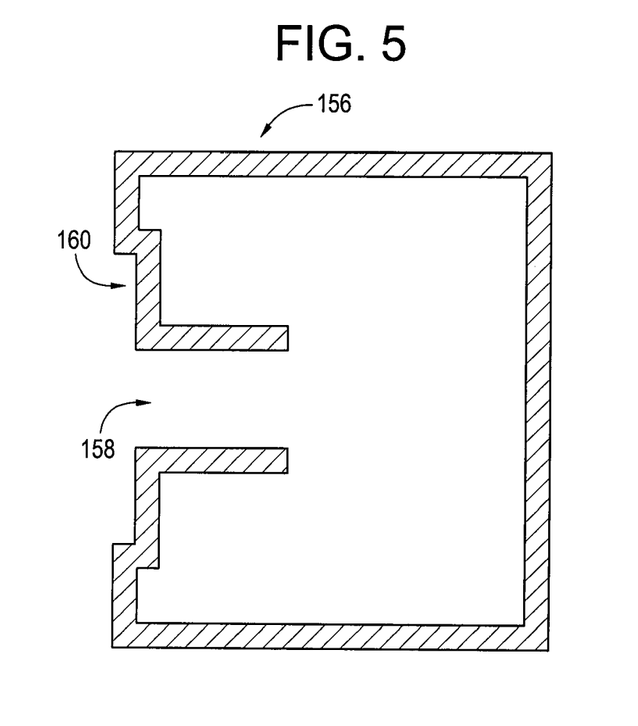
FIG. 5 is a diagrammatic view of a hydraulic housing illustrating a port into which the endform tubular assembly of FIG. 4 is inserted.

FIGS. 3 through 5 illustrate an endform tubular assembly 100 including a clamp plate 162 in accordance with the present invention. As illustrated in FIG. 3 a connector member 102 includes a first shoulder portion 104 including at least one fixing member 124 integral therewith; a second shoulder portion 106 defining a proximal end of the connector member 102, and a brim portion 108 intermediate the first shoulder portion 104 and the second shoulder portion 106, the brim portion 108 extending perpendicularly relative to the first and second shoulder portions, wherein the connector member 102 has an inner wall surface extending longitudinally through the connector member 102, the inner wall further comprising a first inner wall portion 110 having a first diameter, a second inner wall portion 114 having a second diameter, and a third inner wall portion 118 having a third diameter, wherein the second diameter is smaller than both the first diameter and the third diameter, and the third diameter is larger than the second diameter, but may be either larger or smaller than the first diameter In a preferred aspect of the invention, the frusto-conical angle defining the reduction of the inner surface of the first shoulder portion relative to the inner surface of the second shoulder portion is greater than 0° and less than about 90°. Preferably, the angle is about 30° to about 60°. Most preferably the angle will be about 40° to about 50°.

As illustrated in FIG. 4, an endform tubular assembly generally designated 100 includes a connector member 102 having a first shoulder portion 104 defining a distal end of the connector member 102. The first shoulder portion 104 further includes at least one fixing member 124 integral with the distal end of the first shoulder portion 104. The fixing member may be of any configuration suitable to engage the bead and prevent axial movement of the tubular member in the connector member. Typically, the fixing member is a tabular member extending from the distal end of the first shoulder portion of the connector member. The number of fixing members employed is not critical and may range from a single fixing member to several fixing members. Furthermore, when more than one fixing member is employed, such fixing members may have the same or different configuration. The fixing member may be in the form of one or more tabs, projections, notches, indentations, grooves, ridges, etc. The bead 126 is not only an essential feature of the invention for preventing both axial rotation and longitudinal movement of the tubular assembly relative to the connector member, but the proper formation of the bead indicates that a correct length of tubing was employed in the step of forming the bead in the tubular assembly. As further illustrated in FIG. 4, a second shoulder portion 106 defines a proximal end of the connector member 102. A brim portion 108 extends perpendicularly relative to the first and second shoulder portions 104, 106 and intermediate the two shoulder portions 104, 106.

The endform tubular member 128 includes an intermediate portion 170 that has an outer surface corresponding to the inner wall surface of the connector member 102 such that the outer surface of the endform tubular member fixedly engages the inner wall surface of the connector member 102. A distal portion of the endform tubular member 128 has an inner surface and an outer surface, the distal portion extending axially from the intermediate portion. The distal portion has a bead 126 formed therein adjacent the first shoulder portion 104 of the connector member 102. The bead 126 prevents the longitudinal movement of the endform tubular member 128 in the connector member 102 and also fixedly engages the fixing member(s) 124 in the first shoulder portion 104 to prevent axial rotation of the endform tubular member 128 relative to the connector member 102. The endform tubular member 128 further includes a proximal portion having an inner surface and an outer surface. The proximal portion of the second shoulder portion 106 having an inner surface and an outer surface. The second shoulder portion 106 includes an annular ridge 154 formed in the proximal end thereof. The endform tubular member 128 is extending from the proximal end of the connector member 102 is expanded into the notch simultaneously with the formation of the bead in the endform tubular assembly. The expansion of the tubular member 128 into the annular ridge in the proximal end of the second shoulder portion 106 creates a cylindrical area therein, the longitudinal length 178 of which defines a gauge diameter depth 122. The gauge diameter depth 122 not only provides additional means for preventing movement of the endform tubular member 128 relative to the connector member 102, but the longitudinal length of the gauge diameter depth 122 is a direct correlation of material flow into the ridge 154 formed in the proximal end of the first shoulder portion 104.

FIG. 5 schematically illustrates a hydraulic housing 156 having a port 158 for accepting the endform tubular assembly 100. Typically, the port 158 may exhibit a slight annular taper to help squeeze the o-ring during insertion to provide a secure seal. The port 158 includes a recessed portion 160 sized to accept the brim 108 of the connector member. The recessed portion 160 allows the flat surface of the clamp plate 162 to fit flush against the housing. The flush fit of the clamp plate against the housing prevents the clamp plate from being deformed in instances where excessive torque may be unwittingly placed on the single fitting. Such deformation of the clamp plate would not only destroy the clamp plate, but almost certainly would cause irreparable damage to the tubular assemblies and perhaps even to the hydraulic housing port and/or the housing itself.

Figure 6:
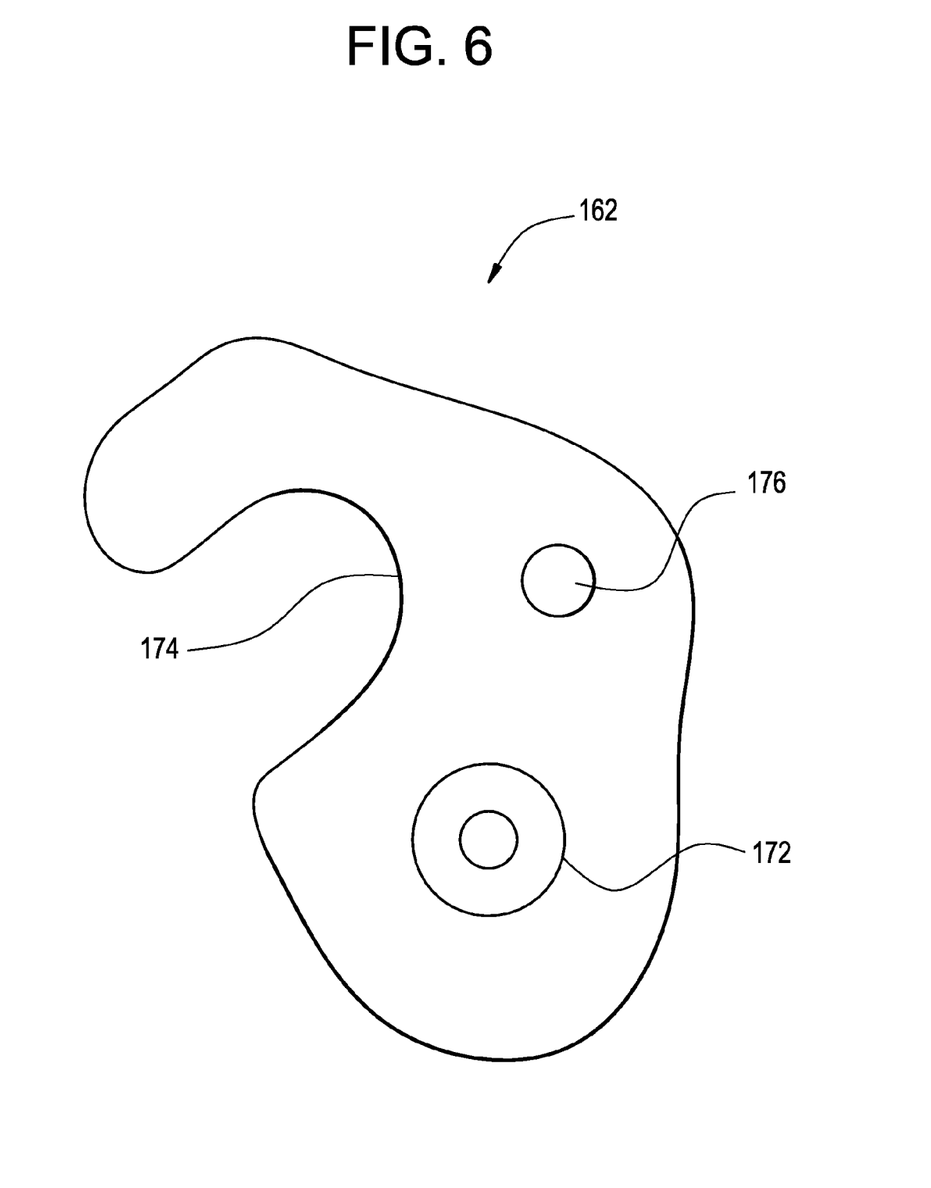
FIG. 6 is a plane view of a clamp plate including an endform tubular assembly press fit together in accordance with the invention.

FIG. 6 is an elevated plan view of the clamp plate 162. The clamp plate 162 includes a first aperture 172 sized to accept the first shoulder portion of the connector member wherein the connector member 102 and the clamp plate 162 are secured together, preferably by press fitting the clamp plate 162 onto the first shoulder portion 104 of the connector member 102. A U-shaped notch 174 on the other end of the clamp plate from the first aperture is configured to accept and secure a return tubular member in the clamp plate 162. A second aperture 176 intermediate the first aperture 172 and the U-shaped notch 174, is sized to receive a fastener such as a bolt, screw, pin, or equivalent for mounting the clamp plate 162 including both of the fluid flow assemblies to the hydraulic housing in one mounting step by applying an appropriate torque to a single fastener.

Sealing members are inevitable in the design of fluid flow assemblies to prevent leaking of the fluid. In the prior art, an o-ring is employed within a circular groove 26, 40 in the proximal end of the tube or in the proximal end of the connector. The formation of such groove requires additional labor and expense. The sealing member 182 of the present invention is simply placed onto the end of the endform tubular member and the tubular member is slightly flared to prevent the sealing member 182 from falling off. The sealing member of the present invention is typically an o-ring and preferably an o-ring formed from a polymeric material such as nitrile-butadiene rubber, hydrogenated nitrile-butadiene rubber, ethylene-acrylate elastomer, ethylene-vinyl acetate copolymer, acrylic rubber, ethylene methacrylate elastomer, tetrafluoroethylene, and blends thereof. A retaining ring 186 is preferably employed between the metal end 152 of the second shoulder portion 106 and the o-ring to help maintain the integrity of the o-ring. The retaining ring 186 is formed from a polymeric material such as Teflon (tetrafluoroethylene), metal or metal alloy. If the retaining ring 186 is formed from a metal, it is preferred that the metal be different and less rigid than the metal used to form the connector member 102. Preferably, the retaining ring 186 is a Teflon retaining ring. In placing the retaining ring 186 against the metal end 152 of the second shoulder portion 106 of the connector member 102, it is important that the perpendicular surface of the connector member 102 be as close to 90° as possible to prevent any undo skewed pressure which may lead to premature failure of the retaining ring 186 and/or o-ring.

The connector member and the endform tubular member are typically formed from a metal having sufficient characteristics to withstand the harsh environment of an automotive vehicle motor compartment and the pressures involved in conveying high pressure fluid. Preferably, both the connector member and the endform tubular assembly are formed from steel or a material having steel as a major ingredient.

As discussed briefly above, certain inherent features present in the endform tubular assembly provides a quantified numerical value which, when compared to a predetermined range of quantified numerical bead diameter values, is a valuable method for assessing the robustness of the resultant endform tubular assembly and for predicting the performance of the endform tubular assembly in high pressure applications over prolonged periods of time.

In a first significant aspect of the invention, it has been found that an accurate measurement of the diameter 180 of bead 126 formed in the endform tubular member 128 at the distal end of the first shoulder portion 104 of the connector member is a direct indicator as to the reliability of the endform tubular assembly 100 in high pressure applications. The proper formation of the bead 126 is an accurate indication that the tubing used during the endforming process was correctly positioned in the forming machine and that the endforming tool employed to form the bead performed within the appropriate specifications. When the diameter 180 of the bead 126 is within a specifically pre-determined range of values, the endform tubular assembly 100 can be expected to perform reliably over a prolonged period of time in high pressure applications. When the measured diameter 180 of the bead 126 is at or near the extreme ends of the predetermined range of values, the robustness of the endform tubular assembly predictably becomes somewhat less reliable. Generally, if the diameter 180 falls outside the predetermined range, the endform tubular assembly is discarded.

In a second significant aspect of the invention, it has been found that an accurate measurement of the length 178 of the inner surface defined as the gauge diameter depth 122 is a direct indicator as to the reliability of the endform tubular assembly 100 in high pressure applications. If the minimum predetermined length 178 of the gauge diameter depth 122 is met or exceeded, the endform tubular member 128 is sufficiently locked to the connector member 102 and can be expected to perform reliably over a prolonged period of time in high pressure applications. When the length 178 of the gauge diameter depth fails to meet the minimum length, the endform tubular assembly 100 is discarded. The accurate measurement of the length 178 of the gauge diameter depth has been found to be a reliable indication of the robustness of the endform tubular assembly.

Prior to the present invention, there were no non-destructive methods for determining the reliability of brazed or welded tubular assembly parts. More importantly, there is no current method for determining whether a particular tubular assembly passes or fails predetermined specifications Accordingly, manufacturers randomly select one or more of the tubular assemblies, cut them open to visually determine the robustness of the selected tubular assemblies, and then adjusts the manufacturing process accordingly. Obviously, the inspected tubular assemblies are destroyed and have to be discarded. Such determinations are inefficient, time consuming, and unreliable at best. The diameter of said bead compared to a predetermined diameter is a reliable indication of the robustness of said endform tubular assembly, during the manufacture of such tubular assemblies.

What is claimed is:

1. An endform tubular assembly for a hydraulic system, said endform tubular assembly comprising:
   (a) a connector member comprising:
      (i) a first shoulder portion, said first shoulder portion defining a distal end of said connector member, said first shoulder portion including at least one fixing member integral therewith; said first shoulder portion;
      (ii) a second shoulder portion defining a proximal end of said connector member; and
      (iii) a brim portion intermediate said first shoulder portion and said second shoulder portion, said brim portion extending perpendicularly relative to said first shoulder portion and said second shoulder portion, said connector member having an inner wall surface extending therethrough comprising a first inner wall portion having a first diameter, a second inner wall portion having a second diameter, and a third inner wall portion having a third diameter, wherein said second diameter is different from said first diameter, and said third diameter is different from said second diameter, said third diameter forming a gauge diameter depth in said proximal end of said connector member;
   (b) an endform tubular member comprising:
      (i) an intermediate portion having an inner surface and an outer surface, said outer surface of said intermediate portion corresponding to said inner wall surface of said connector member, wherein said outer surface of said endform tubular member fixedly engages said inner wall surface of said connector member;
      (ii) a distal portion having an inner surface and an outer surface, said distal end extending axially from said intermediate portion, said distal portion having a bead formed therein adjacent said first shoulder portion of said connector member, wherein said bead fixedly engages said at least one fixing member in said first shoulder portion to prevent axial rotation of said endform tubular member relative to said connector member, the diameter of said bead compared to a predetermined diameter is a reliable indication of the robustness of said endform tubular assembly; and
      (iii) a proximal portion having an inner surface and an outer surface, said proximal end extending axially from said intermediate portion, said inner surface of said proximal portion defining a gauge diameter depth, the depth of said gauge diameter depth compared to a predetermined depth is a reliable indication of the robustness of said endform tubular assembly.

2. The endform tubular assembly of claim 1 wherein said second inner wall portion has a reduced diameter compared to said diameter of said first inner wall portion and said third inner wall portion has an increased diameter compared to said second diameter.

3. The endform tubular assembly of claim 2 wherein said second inner wall portion having a reduced diameter exhibits an inner concentric reduction angle up to about 90° compared to said diameter of said first inner wall portion.

4. The endform tubular assembly of claim 3 wherein said second inner wall portion having a reduced diameter exhibits an inner concentric reduction angle of about 15° to about 60° compared to said diameter of said first inner wall portion.

5. The endform tubular assembly of claim 1 further comprising a sealing member disposed on said outer surface of said proximal portion of endform tubular member, said sealing member configured to mate with said hydraulic housing to seal said endform tubular member to said hydraulic housing.

6. The endform tubular assembly of claim 5 wherein said sealing member includes an o-ring disposed on said outer surface of said proximal end of said endform tubular assembly adjacent said second shoulder portion of said connector member, said second shoulder portion of said connector member exhibiting a perpendicular angle of about 90° with respect to said outer surface of said proximal end of said endform tubular assembly.

7. The endform tubular assembly of claim 6 wherein said o-ring is formed from a polymeric material selected from the group consisting of nitrile-butadiene rubber, hydrogenated nitrile-butadiene rubber, ethylene-acrylate elastomer, ethylene-vinyl acetate copolymer, acrylic rubber, ethylene methacrylate elastomer, tetrafluoroethylene and blends thereof.

8. The endform tubular assembly of claim 6 wherein said proximal end of said endform tubular assembly is flared to retain said o-ring thereon.

9. The endform tubular assembly of claim 6 further including a retaining ring between said o-ring and said second shoulder portion of said connector member, said retaining ring having sufficient resilience to prevent deformation of said o-ring.

10. The endform tubular assembly of claim 9 wherein said retaining ring is formed from a polymeric material, a metal or a metal alloy.

11. The endform tubular assembly of claim 10 wherein said retaining ring is a polytetrafluoroethylene ring.

12. The endform tubular assembly of claim 1 wherein said endform tubular assembly is employed as at least one of a first tubular assembly and a second tubular assembly in a fluid flow assembly for a power steering system, wherein said fluid flow assembly comprises a housing having a steering gear disposed therein, said housing including a first port extending from an outer surface of said housing to an inner surface of said housing and a second port extending from said outer surface of said housing to said inner surface of said housing; a pump; a first endform tubular assembly having a first end connected to said first port in said housing and a second end attached to said pump, wherein said first endform tubular assembly conveys fluid under pressure from said pump to said housing through said first port; and a second tubular assembly having a first end connected to said second port in said housing and a second end connected to said pump, wherein said second tubular assembly conveys fluid from said housing to said pump, and a clamp plate having a first aperture through which said first tubular assembly extends, a U-shaped second aperture through which said second tubular assembly extends, and a third aperture configured for connecting said clamp plate to said hydraulic housing, wherein said first port for receiving said first tubular assembly and said second port for receiving said second tubular assembly are configured to receive said first tubular assembly and said second tubular assembly such that said clamp plate fits flush against said housing.

13. The endform tubular assembly of claim 12 wherein said second tubular member comprises a proximal end portion having a sealing member configured to mate with said housing for sealing said second tubular member to said housing such that said clamp plate fits flush against said housing.

14. The endform tubular assembly of claim 13, wherein said proximal end of said endform tubular fitting assembly is flared to retain said o-ring thereon.

15. The endform tubular assembly of claim 1, wherein said connector portion is metal or metal alloy.

16. The endform tubular assembly of claim 1, wherein said endform tubular member is metal or metal alloy.

17. The endform tubular assembly of claim 1 wherein said at least one fixing member is a non-uniform surface.

18. The endform tubular assembly of claim 17 wherein said non-uniform surface is one or more projections, indentations, grooves, ridges or combinations thereof.

19. A fluid flow assembly for a power steering system, wherein said fluid flow assembly comprises a housing having a steering gear disposed therein, said housing including a first port extending from an outer surface of said housing to an inner surface of said housing and a second port extending from said outer surface of said housing to an inner surface of said housing; a pump; a first tubular assembly having a first end connected to said first port in said housing and a second end attached to said pump, wherein said first tubular assembly conveys fluid under pressure from said pump to said housing; a second tubular assembly having a first end connected to said housing and a second end connected to said pump wherein said second tubular assembly conveys fluid from said housing to said pump; and a clamp plate having a first aperture through which said first tubular assembly extends, a U-shaped second aperture having an open end through which said second tubular assembly extends, and a third aperture configured for connecting said clamp plate to said steering gear housing, wherein said first port for receiving said first tubular assembly and said second port for receiving said second tubular assembly are configured to receive said first tubular assembly and said second tubular assembly such that said clamp plate fits flush against said housing, said first tubular assembly comprising:

(a) an endform tubular assembly disposed between a pump and a housing having a steering gear disposed therein for conveying pressurized fluid from said pump to said housing, said housing having a port therein configured to accept said endform tubular assembly, said endform tubular assembly comprising:

(1) a connector member comprising:

(i) a first shoulder portion, said first shoulder portion defining a distal end of said connector member, said first shoulder portion including at least one fixing member integral with said first shoulder portion;

(ii) a second shoulder portion defining a proximal end of said connector member; and (iii) a brim portion intermediate said first shoulder portion and said second shoulder portion, said brim portion extending perpendicularly relative to said first shoulder portion and said second shoulder portion, said connector member having an inner wall surface extending therethrough comprising a first inner wall portion having a first diameter, a second inner wall portion having a second diameter, and a third inner wall portion having a third diameter, wherein said second diameter is different from said first diameter, and said third diameter is different from said second diameter, said third diameter forming a gauge diameter depth in said proximal end of said connector member;

(b) an endform tubular member comprising:

(i) an intermediate portion having an inner surface and an outer surface, said outer surface corresponding to said inner wall surface of said connector member, wherein said outer surface of said endform tubular member fixedly engages said inner wall surface of said connector member;

(ii) a distal portion having an inner surface and an outer surface, said distal end extending axially from said intermediate portion, said distal portion having a bead formed therein adjacent said first shoulder portion of said connector member, wherein said bead fixedly engages said at least one locking member to prevent axial rotation of said endform tubular member relative to said connector member, the diameter of said bead compared to a predetermined diameter is a reliable indication of the robustness of said endform tubular fitting assembly; and (iii) a proximal portion having an inner surface and an outer surface, said proximal end extending axially from said intermediate portion, wherein said inner surface of said proximal portion defines a gauge diameter depth, the depth of said gauge diameter depth compared to a predetermined depth is a reliable indication of the robustness of said endform tubular fitting assembly;

(c) an o-ring disposed on said outer surface of said proximal portion of said endform tubular fitting member, said o-ring configured to mate with said housing to seal said endform tubular fitting member to said housing, wherein said proximal end of said endform tubular fitting assembly is flared to retain said o-ring thereon; and (d) a retaining ring disposed between said o-ring and said outer surface of said shoulder portion of said endform tubular fitting assembly, said retaining ring having sufficient resilience to prevent extrusion of said o-ring onto said second shoulder.

20. The endform tubular assembly of claim 19 wherein said second inner wall portion having a smaller diameter exhibits an inner concentric reduction angle up to about 90° compared to said diameter of said first inner wall portion.

21. The endform tubular assembly of claim 20 wherein said second inner wall portion having a reduced diameter exhibits an inner concentric reduction angle of about 15° to about 60° compared to said diameter of said first inner wall portion.

22. The endform tubular assembly of claim 19, wherein said second shoulder portion of said connector member exhibits an angle of about 90° with respect to said outer surface of said proximal end of said endform tubular fitting assembly.

23. The endform tubular assembly of claim 19, wherein said connector member is metal or metal alloy.

24. The endform tubular assembly of claim 19, wherein said endform tubular member is metal or metal alloy.

25. The endform tubular assembly of claim 19 wherein said at least one fixing member is a non-uniform surface.

26. The endform tubular assembly of claim 25 wherein said non-uniform surface is one or more projections, indentations, grooves, ridges or combinations thereof.

27. In a fluid flow assembly for a power steering system wherein first and second tubular assemblies are mounted onto a bracket and simultaneously secured to a steering gear wherein the first and second tubular assemblies include either a connector having opposed shoulders on either side of the bracket or the tubular member is deformed to create beads on either side of the bracket to restrict movement, the improvement comprising a fluid flow assembly for a power steering system wherein at least one of the supply hose and return hose comprises an endform tubular assembly, said endform tubular assembly comprising:

(a) an endform tubular assembly disposed between a pump and a housing having a steering gear disposed therein for conveying pressurized fluid from said pump to said housing, said housing having a port therein configured to accept said endform tubular assembly such that said clamp plate fits flush with said housing, said endform tubular assembly comprising:

(1) a connector member comprising:
(i) a first shoulder portion defining a distal end of said connector member, said first shoulder portion including at least one fixing member integral therewith;
(ii) a second shoulder portion defining a proximal end of said connector member; and
(iii) a brim portion intermediate said first shoulder portion and said second shoulder portion, said brim portion extending perpendicularly relative to said first shoulder portion and said second shoulder portion, said connector member having an inner wall surface extending therethrough comprising a first inner wall portion having a first diameter, a second inner wall portion having a second diameter, and a third inner wall portion having a third diameter, wherein said second diameter is different from said first diameter, and said third diameter is different from said second diameter, said third diameter forming a gage diameter depth in said proximal end of said connector member;

(2) a connector member having a first shoulder portion defining a distal end of said connector member, said first shoulder portion including at least one fixing member integral therewith; a second shoulder portion defining a proximal end of said connector member, and a brim portion intermediate said first shoulder portion and said second shoulder portion, said brim portion extending perpendicularly relative to said first shoulder portion and said second shoulder portion, said connector member having an inner wall surface extending longitudinally therethrough comprising a first inner wall portion having a first diameter, a second inner wall portion having a second diameter, and a third inner wall portion having a third diameter, wherein said second diameter is smaller than said first diameter, and said second diameter is smaller than said third diameter;

(b) an endform tubular member comprising:
(i) an intermediate portion having an inner surface and an outer surface, said outer surface corresponding to said inner wall surface of said connector member, wherein said outer surface of said endform tubular member fixedly engages said inner wall surface of said connector member;
(ii) a distal portion having an inner surface and an outer surface, said distal end extending axially from said intermediate portion, said distal portion having a bead formed therein adjacent said first shoulder portion of said connector member, wherein said bead fixedly engages said at least one locking member to prevent axial rotation of said endform tubular member relative to said connector member, the diameter of said bead compared to a predetermined diameter is a reliable indication of the robustness of said endform tubular fitting assembly; and
(iii) a proximal portion having an inner surface and an outer surface, said proximal end extending axially from said intermediate portion, wherein said inner surface of said proximal portion defines a gauge diameter depth, the depth of said gauge diameter depth compared to a predetermined depth is a reliable indication of the robustness of said endform tubular fitting assembly;

(c) an o-ring disposed on said outer surface of said proximal portion of said endform tubular fitting member, said o-ring configured to mate with said housing to seal said endform tubular fitting member to said housing, wherein said proximal end of said endform tubular fitting assembly is flared to retain said o-ring thereon; and (d) a retaining ring disposed between said o-ring and said outer surface of said shoulder portion of said endform tubular fitting assembly, said retaining ring having sufficient resilience to prevent extrusion of said o-ring onto said second shoulder.

28. The fluid flow assembly of claim 27 wherein said second inner wall portion has a reduced diameter compared to said diameter of said first inner wall portion.

29. The fluid flow assembly of claim 28 wherein said second inner wall portion having a reduced diameter compared to said diameter of said first inner wall portion exhibits an inner concentric reduction angle up to about 90°.

30. The fluid flow assembly of claim 29 wherein said second inner wall portion having a reduced diameter compared to said diameter of said first inner wall portion exhibits an inner concentric reduction angle of about 15° to about 60°.

31. The fluid flow assembly of claim 27 wherein said sealing member includes an o-ring disposed on said outer surface of said proximal end of said endform tubular fitting assembly adjacent said second shoulder portion of said connector member, said second shoulder portion of said connector member exhibiting an angle of about 90° with respect to said outer surface of said proximal end of said endform tubular fitting assembly.

32. The fluid flow assembly of claim 28 wherein said o-ring is formed from a polymeric material selected from the group consisting of nitrile-butadiene rubber, hydrogenated nitrile-butadiene rubber, ethylene-acrylate elastomer, ethylene-vinyl acetate copolymer, acrylic rubber, ethylene methacrylate elastomer, and blends thereof.

33. The fluid flow fitting assembly of claim 31 further including a retaining ring between said o-ring and said second shoulder portion of said connector member, said retaining ring having sufficient resilience to prevent extrusion of said o-ring onto said second shoulder.

34. The fluid flow assembly of claim 33 wherein said retaining ring is formed from a polymeric material, a metal or a metal alloy.

35. The fluid flow assembly of claim 34 wherein said retaining ring is a teflon ring.

36. The fluid flow assembly of claim 27, wherein said connector member is metal or metal alloy.

37. The fluid flow assembly of claim 27, wherein said endform tubular member is metal or metal alloy.

38. The endform tubular assembly of claim 27 wherein said at least one fixing member is a non-uniform surface.

39. The endform tubular assembly of claim 38 wherein said non-uniform surface is one or more projections, indentations, grooves, ridges or combinations thereof.

* * * * *